(12) United States Patent
Inakura

(10) Patent No.: US 8,023,803 B2
(45) Date of Patent: Sep. 20, 2011

(54) MOVING PICTURE RECORDING APPARATUS

(75) Inventor: Keita Inakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1155 days.

(21) Appl. No.: 11/551,886

(22) Filed: Oct. 23, 2006

(65) Prior Publication Data

US 2007/0092225 A1    Apr. 26, 2007

(30) Foreign Application Priority Data

Oct. 25, 2005   (JP) .................. 2005-310571

(51) Int. Cl.
*H04N 5/92* (2006.01)
*H04N 5/928* (2006.01)

(52) U.S. Cl. ...................... 386/337; 386/338

(58) Field of Classification Search .......... 386/1, 45–46, 386/95–96, 125
See application file for complete search history.

(56) References Cited

U.S. PATENT DOCUMENTS 4,065,794 A * 12/1977 Shutterly ...................... 386/101
6,148,136 A   11/2000 Tanaka et al. .................. 386/46
6,611,655 B1 * 8/2003 Murase et al. .................. 386/99
6,987,924 B1 * 1/2006 Fujita et al. .................... 386/46

FOREIGN PATENT DOCUMENTS

| EP | 0957639 A | 11/1999 |
| JP | 11-330980 A | 11/1999 |
| JP | 2004-319002 A | 11/2004 |
| WO | WO97/47132 | 12/1997 |

OTHER PUBLICATIONS

The above references (1-2) were cited in a Jul. 16, 2010 Japanese Office Action, that issued in Japanese Patent Application No. 2005-310571.

* cited by examiner

*Primary Examiner* — Thai Tran
*Assistant Examiner* — Nigar Chowdhury
(74) *Attorney, Agent, or Firm* — Cowan, Liebowitz & Latman, P.C.

(57) ABSTRACT

A moving picture recording apparatus comprises an acquisition unit which acquires moving picture data that includes video data and at least two channels of audio data; a first recording unit which records the moving picture data as a moving picture file; an extracting unit which extracts audio data of channels from a third channel onward included in the moving picture data; and a second recording unit which records the extracted audio data of channels from the third channel onward as an audio file different from the moving picture file.

6 Claims, 9 Drawing Sheets

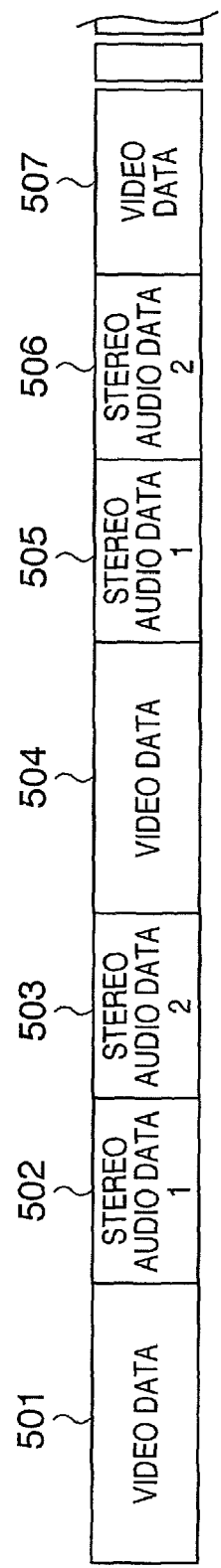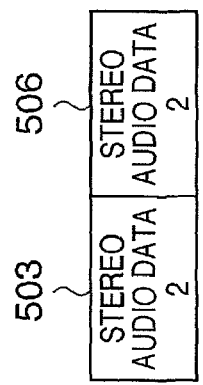

MOVING PICTURE RECORDING APPARATUS

BACKGROUND OF THE INVENTION

1. Field of the Invention

The present invention relates to a moving picture recording apparatus for recording moving picture data that includes audio data and video data.

2. Description of the Related Art

Digital video cameras at present are capable of recording moving picture data, which includes video data and audio data, on a storage medium such as magnetic tape (see the specification of WO97/47132). Further, digital video cameras at present are also capable of outputting moving picture data to a personal computer using a network interface that complies with IEEE 1394 standards or USB standards, etc. The personal computer records the moving picture data, which has been output from the digital video camera, on a hard disk device. If a non-linear editing application has been installed in the personal computer, then the personal computer can edit the moving picture data, which has been recorded on the hard disk, in accordance with an instruction from the user.

In a case where moving picture data that includes audio data on three or more channels and video data is output from a digital video camera to a personal computer, the personal computer is capable of recording the moving picture data in one moving picture file. In such case, depending upon the non-linear application that has been installed in the personal computer, there may be instances where the audio data on each channel cannot be recognized normally even if the video data in the moving picture file can be recognized. In this case, it is necessary to record the video data and the three or more channels of audio data from the moving picture file in separate files. Further, it is necessary to further record the three or more channels of audio data in separate audio files depending upon the non-linear editing application.

SUMMARY OF THE INVENTION

The present invention is directed to overcome the above-described drawbacks and disadvantages. The present invention makes, for example, it possible to readily edit moving picture data that includes audio data on three or more channels and video data.

According to an aspect of the present invention, there is provided a moving picture recording apparatus comprising: an acquisition unit which acquires moving picture data that includes video data and at least two channels of audio data; a first recording unit which records the moving picture data as a moving picture file; an extracting unit which extracts audio data of channels from a third channel onward included in the moving picture data; and a second recording unit which records the extracted audio data of channels from the third channel onward as an audio file different from the moving picture file.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIGS. 8A and 8B are diagrams illustrating examples of the structures of a moving picture file and audio file recorded by the moving picture recording apparatus according to an exemplary embodiment of the invention.

DESCRIPTION OF THE EMBODIMENTS

Exemplary embodiments, features and aspects of the present invention will now be described in detail below with reference to the attached drawings.

Figure 1:
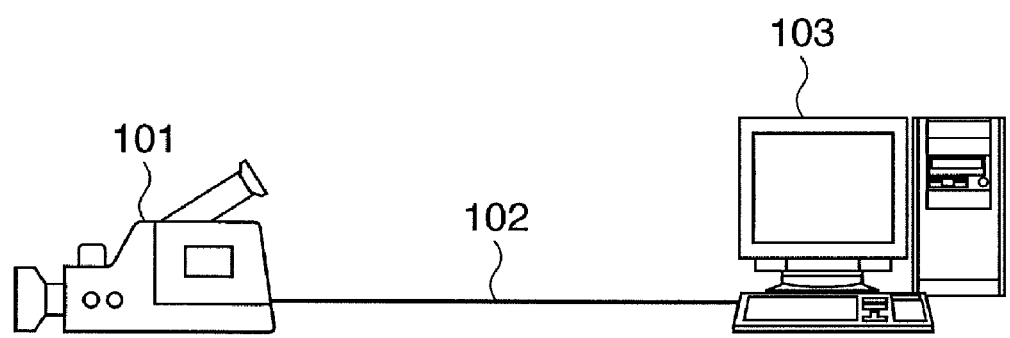
FIG. 1 is a diagram illustrating an example of use of a moving picture recording apparatus according to an exemplary embodiment of the present invention.

FIG. 1 is a diagram illustrating an example of use of a moving picture recording apparatus according to an exemplary embodiment of the present invention.

As shown in FIG. 1, a DVC (Digital Video Camera) 101 is an image capture device in this embodiment, and a personal computer 103 is a moving picture recording apparatus according to this embodiment. It should be noted that the image capture device in this embodiment is not limited to a digital video camera and may be any device having a function that enables it to operate as a digital video camera. Further, the moving picture recording apparatus according to this embodiment is not limited to a personal computer and can be implemented by various devices other than a personal computer. In this embodiment, the DVC 101 and personal computer 103 have network interfaces compliant with IEEE 1394. A network interface compliant with IEEE 1394 shall be referred to as an "IEEE 1394 interface" below. A network interface cable 102 is connected via the IEEE 1394 interfaces of the DVC 101 and personal computer 103.

The DVC 101 is adapted so as to be capable of outputting moving picture data (streaming data) in the MPEG2-TS format using isochronous transfer stipulated by IEEE 1394.

At the present time, an IEC 61883-1 standard and an IEC 61883-4 standard are known as standards used when moving picture data in the MPEG2-TS format is transmitted on an IEEE 1394 interface. The data format of a CIP (Common Isochronous Packet) header is defined by the IEC 61883-1 standard. Further, the data format of an SPH (Source Packet Header) is defined by the IEC 61883-1 standard.

An isochronous packet according to IEEE 1394 has a 4-byte isochronous packet header, a CIP header that follows, and a data field that follows the CIP header. The data field includes zero or more 192-byte source packets each composed of a 4-byte source packet header (SPH) and a 188-byte MPEG2-TS packet.

Figure 2:
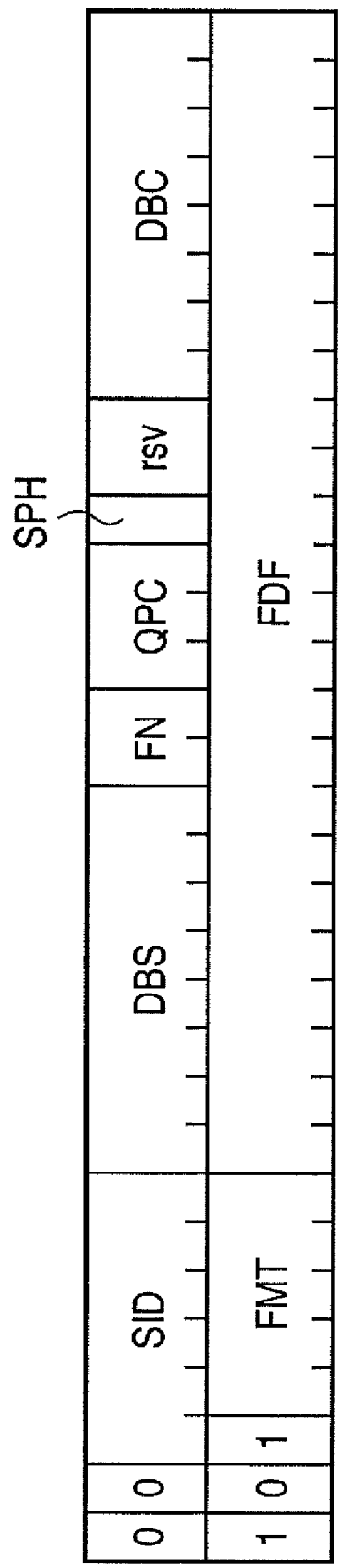
FIG. 2 is a diagram illustrating the data format of a CIP (Common Synchronous Packet) header.
Figure 3:
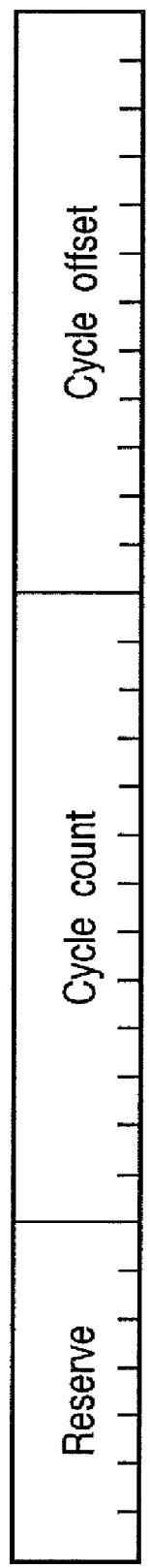
FIG. 3 is a diagram illustrating an SPH (Source Packet Header) data format.

The data of the CIP header is illustrated in FIG. 2, and the data format of the SPH is illustrated in FIG. 3.

The data indicated below is stored in each field shown in FIG. 2. It should be noted that a quadlet signifies four bytes (32 bits).

SID: Source node ID
DBS: Data Block Size in quadlets
FN: Fraction Number
QPC: Quadlet Padding Count
SPH: Source Packet Header present
DBC: Data Block Continuity counter
FMT: Format ID
FDF: Format Dependent Field In FIG. 3, a cycle count field 201 that occupies 13 bits in the SPH is an 8-kHz (8000 counts/second) counter. This is in accordance with the fact that isochronous transfer according to IEEE 1394 is stipulated as 8000 times/second. An offset value is stored in a cycle offset field 202 having a bit length of 12 bits. The SPH is used to adjust the timing at which each TS packet is input to an MPEG2-TS codec. For further details concerning these headers, refer to the specifications mentioned above.

Figure 9:
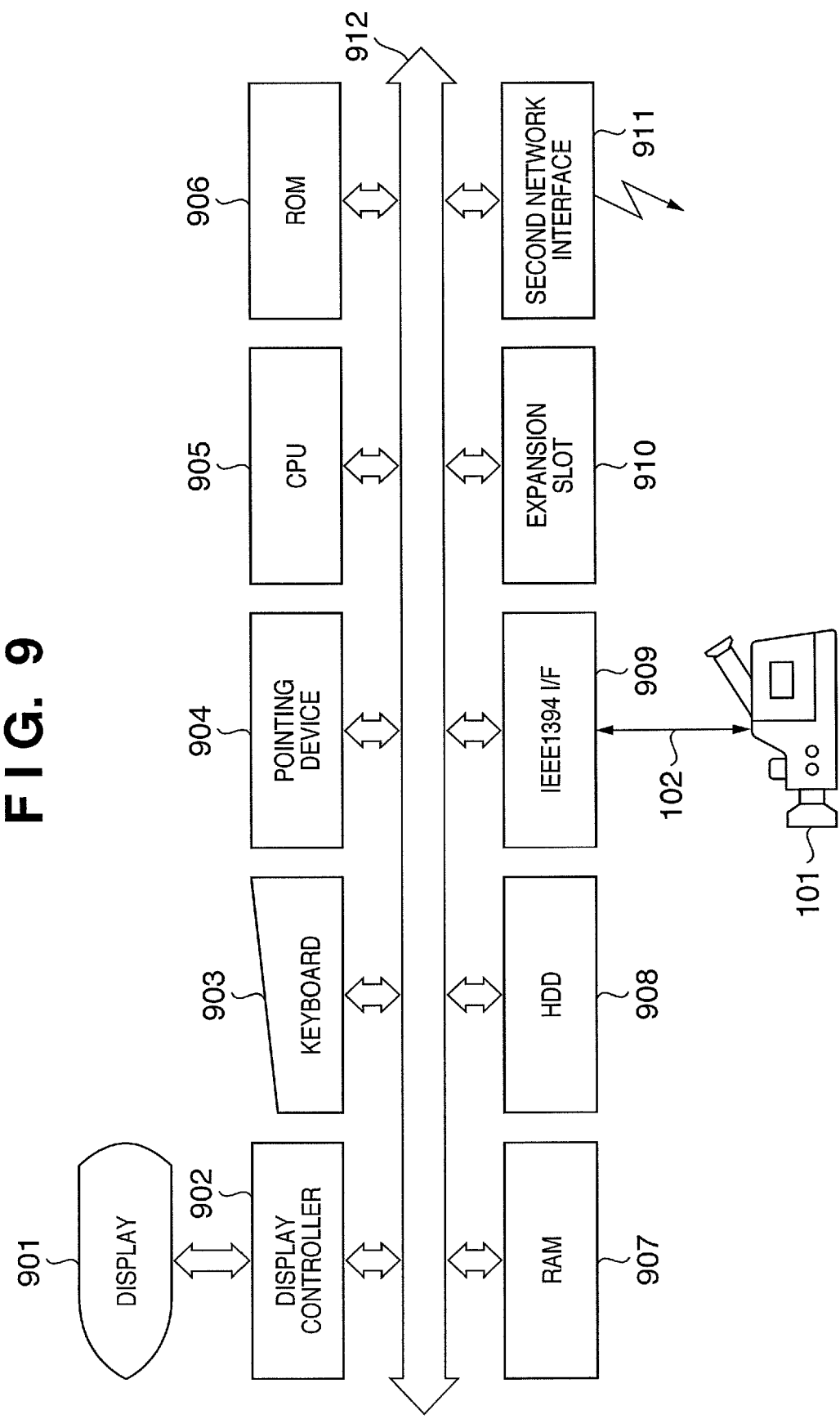
FIG. 9 is a block diagram illustrating an example of the structure of a personal computer capable of being utilized as a moving picture recording apparatus according to exemplary embodiment of the invention.

FIG. 9 is a block diagram illustrating an example of the structure of the personal computer 103, which is the moving picture recording apparatus according to this embodiment.

In FIG. 9, a display 901 is a display unit for displaying data and information being processed and various message menus, etc., by an application program. The display 901 can be constructed from CRT (Cathode Ray Tube) or LCD (Liquid Crystal Display), etc. A display controller 902 controls displays presented on the display 901. A keyboard 903 and a pointing device 904 are used to input characters, etc., and to point to icons and button and the like on a GUI (Graphical User Interface). A CPU (Central Processing Unit) 905 exercises overall control of the personal computer 103.

A ROM (Read-Only Memory) 906 stores programs executed by the CPU 905, as well as parameters, etc. A RAM (Random-Access Memory) 907 is used as a work area when the CPU 905 executes various programs, and as a temporary save area at the time of error processing. A hard disk drive (HDD) 908 functions as an external moving picture recording device.

It should be noted that a program for implementing various functions of the personal computer 103 in this embodiment, an operating system, an application program such as a browser, data and a library, etc., are stored in one or more of the ROM 906 and hard disk drive 908 depending upon the application.

An IEEE 1394 interface 909 is a network interface in line with the IEEE 1394 standard. The IEEE 1394 interface 909 is connected to the DVC 101 via the network interface cable 102.

An expansion slot 910 is for an expansion board compliant with the PCI (Peripheral Component Interconnect) bus standard. Various expansion boards such as a video capture board, sound board and GPIB board can be inserted into the expansion slot 910. Instead of being connected to the IEEE 1394 interface 909, the DVC 101 may be connected to a network interface having a video capture board inserted into the expansion slot 910.

A second network interface 911 has a LAN-compliant wired communication function or a wireless communication function compliant with the IEEE 802.11a/b/g or Bluetooth standard, etc. A bus 912 comprises an address bus, data bus and control bus and interconnects the above-mentioned units.

Figure 4:
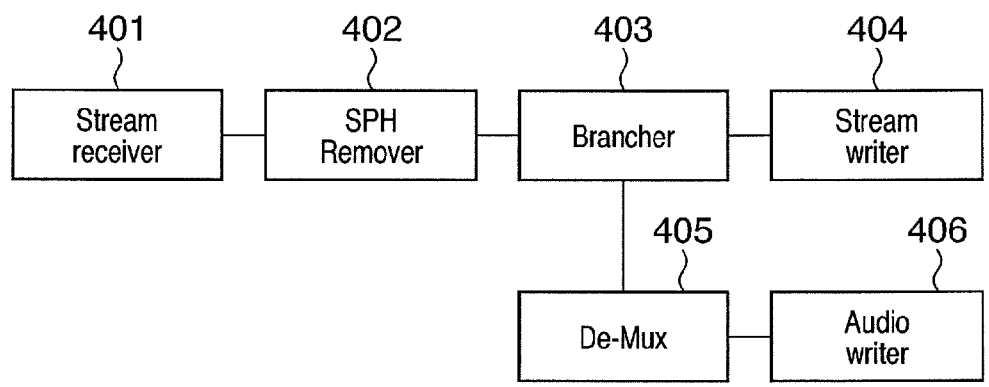
FIG. 4 is a block diagram illustrating an example of the functional structure of the moving picture recording apparatus according to an exemplary embodiment of the invention.

FIG. 4 is a block diagram illustrating an example of the functional structure of the moving picture recording apparatus according to this embodiment.

A stream receiver 401, which is a receiving unit, receives an MPEG2-TS data stream transferred by an isochronous packet via the IEEE 1394 interface. An SPH remover 402, which is a stream packet extracting unit, removes the SPH from a source packet included in the data field of the isochronous packet and transfers only the MPEG-TS data to a brancher 403.

The brancher 403, which is a distributing unit, transfers the received MPEG2-TS data to two blocks, namely a stream writer 404 and a demultiplexer 405. The stream writer 404, which is a reconstructing unit, stores the MPEG2-TS data, which is received successively from the brancher 404, as a single streaming data file. Further, the demultiplexer 405 extracts any number of items of channel data from voice channel data included in the MPEG2-TS data received from the brancher 403 and transfers the channel data to an audio writer 406. The latter, which is an audio recording unit, stores audio data received from the demultiplexer 405 in one file or in a plurality of files on a per-channel basis.

The functional blocks illustrated in FIG. 4 may be implemented in the form of software by having the CPU 905 shown in FIG. 9 execute a control program that has been stored in the ROM 906 or hard disk drive 908. Further, one or more blocks may be implemented by special-purpose hardware.

Figure 5:
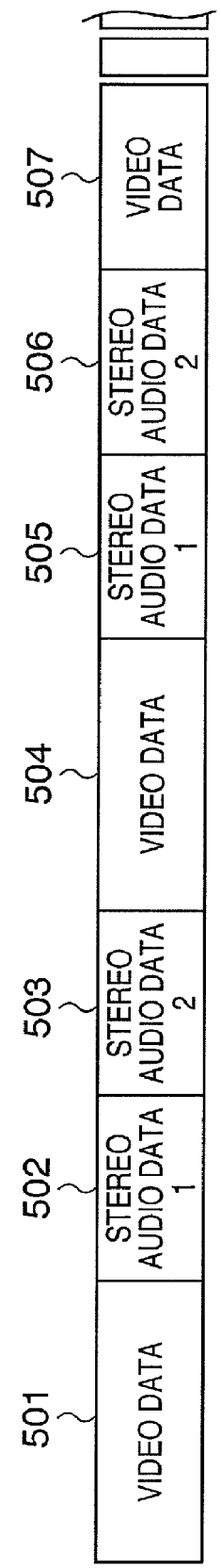
FIG. 5 is a diagram illustrating an example of the structure of moving picture data received by the moving picture recording apparatus according to an exemplary embodiment of the invention.

FIG. 5 is a diagram illustrating an example of the structure of moving picture data received by the moving picture recording apparatus according to this embodiment.

The moving picture data shown in FIG. 5 is in the MPEG2-TS format. In a case where the data is transferred on the IEEE 1394 interface, transfer is by IEEE 1394 isochronous packets in units of source packets in which the 4-byte SPH is appended to each 188-byte TS packet.

The moving picture data shown in FIG. 5 is composed of interleaved video data (501, 504, 507), stereo audio data 1 (502, 505) and stereo audio data 2 (503, 506). The picture data is in the MPEG-2 Video format, and the stereo audio data 1 and stereo audio data 2 are in the MPEG-1 Audio Layer 2 format. An MC header compliant with the MPEG-2 Audio Layer 2 format is used in order to join the stereo audio data 1 and stereo audio data 2 (see the ISO/IEC 13818-3 standard). The MC header joins the stereo audio data within an AAU (Audio Access Unit). The AAU is a set of one frame's worth of audio data of the MPEG audio bit stream and is the smallest unit capable of being decoded independently into an audio signal.

Figure 6:
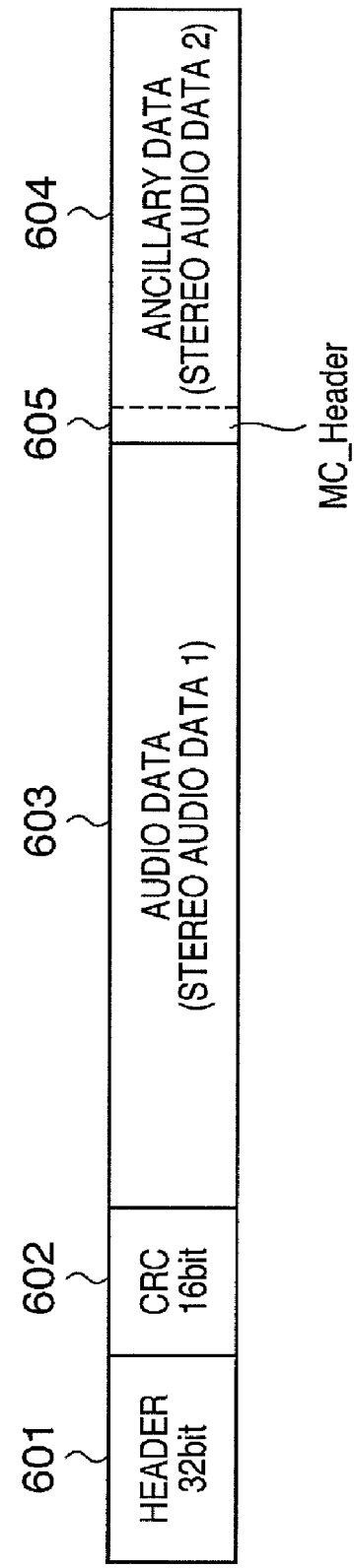
FIG. 6 is a diagram illustrating the structure of an AAU (Audio Access Unit)

FIG. 6 illustrates the structure of the AAU. A header 601 of the AAU is composed of a synchronous pattern, an ID of the AAU and a bit representing whether or not a CRC exists. An error check code 602 such as a CRC is handled optionally. Whether or not the CRC exists is determined by referring to the value of a specific bit of the header 601. Actual audio data 603 is data obtained by encoding audio, which has been sampled at a prescribed sampling rate, in the MPEG-1 Audio Layer 2 format. In this embodiment, the stereo audio data 1 is recorded in this area using channels 1 and 2.

Ancillary data is indicated at 604 in FIG. 6. The AAU is one frame of audio data the length of which is decided by the number of samples needed for decoding, the sampling frequency and the transmission rate. However, the audio data is variable-length data. In a case where the audio data does not reach the end of the AAU (the predetermined length of the AAU), therefore, the data area up to the end of the AAU is filled with the ancillary data 604.

In this embodiment, the stereo audio data 2 is recorded in the area of the ancillary data using the channels 3 and 4. At this time an MC header 605 (see ISO/IEC 13818-3) is placed at the beginning of the ancillary data, and the stereo audio data 1 and stereo audio data 2 are incorporated in one AAU. It should be noted that information for identifying a channel and time information for achieving synchronization with video data are recorded together in the stereo audio data 1 and stereo audio data 2. Further, in this embodiment, the structure of the moving picture data in FIG. 5 is such that one item of the stereo audio data 1 and one item of the stereo audio data 2 are placed between items of video data. In actuality, however, the number placed is equivalent to the number of AAUs.

Figure 7:
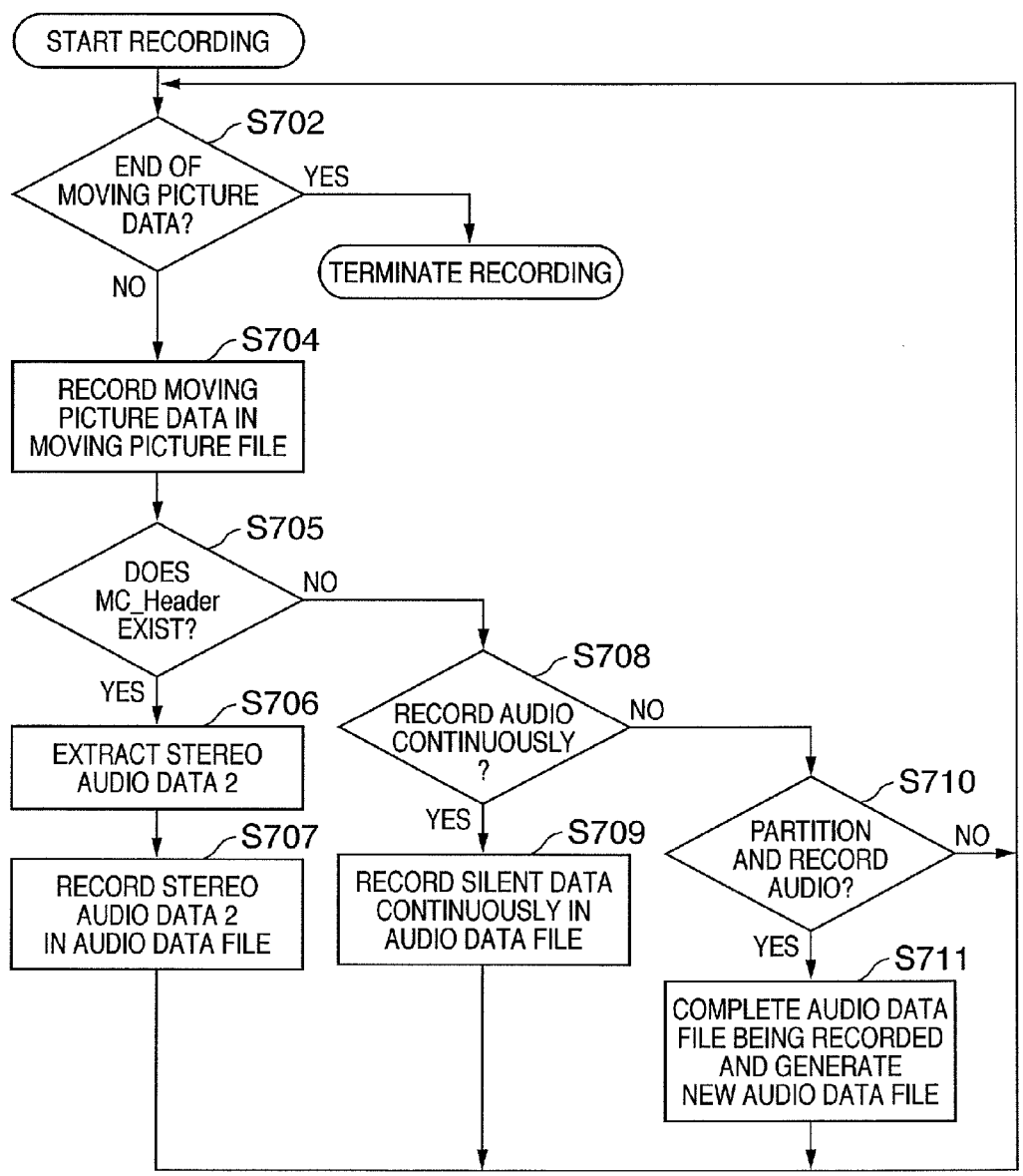
FIG. 7 is a flowchart illustrating operation when the moving picture recording apparatus of an exemplary embodiment records moving picture data.

Next, reference will be had to the flowchart shown in FIG. 7 to describe a recording operation performed in the moving picture recording apparatus of this embodiment.

The recording of moving picture data is performed in a state in which the DVC 101 and personal computer 103 are connected by the network interface cable 102 in the manner illustrated in FIG. 1, by way of example. If the moving picture recording apparatus is the personal computer 103, then a moving picture loading application that causes the personal computer to operate as the apparatus having the functional structure shown in FIG. 4 is executed. Moving picture data starts being received by operating the GUI of the moving picture loading application to apply a playback or record command to the DVC 101. Such control of the DVC 101 from the personal computer application can be implemented by a well-known AV/C command.

The recording operation illustrated in FIG. 7 starts with the start of receipt of the moving picture data.

As already mentioned, the MPEG2-TS data shown in FIG. 5 has been transmitted from the DVC 101 to the personal computer 103 of this embodiment by an isochronous packet via the network interface cable 102. The stream receiver 401 of the personal computer 103 receives this isochronous packet. The SPH shown in FIG. 3 is removed via the SPH remover 402 and the MPEG2-TS packet in the isochronous packet is sent to the brancher 403.

Whether the moving picture data has ended is discriminated (step S702). If the moving picture data has ended, then recording (file output) is terminated. It is decided that the moving picture data has ended if the brancher 403 does not receive an input of the MPEG2-TS data from the stream receiver 401 within a prescribed period of time. If the moving picture data has not ended, then the MPEG2-TS stream is sent to the stream writer 404 and the received moving picture data is output as a file (step S704). The moving picture file is stored in the hard disk drive 908, by way of example.

At the same time, the brancher 403 sends the MPEG2-TS data to the demultiplexer 405. The latter demultiplexes the MPEG2-TS data into audio data and video data and determines whether the stereo audio data 2 is present. More specifically, the demultiplexer 405 reads in the stereo audio data 1 (603) in order to analyze the AAU. Furthermore, whether the MC header 605 has been placed immediately following the stereo audio data 1 (603), i.e., at the beginning of the ancillary data 604, of the AAU is detected.

If the MC header 605 has been placed immediately following the stereo audio data 1 (603), then it is decided that the stereo audio data 2 is included in the ancillary data 604 ("YES" at step S705). When it has been decided that the stereo audio data 2 is included in the AAU, the stereo audio data 2 (503, 506) is extracted from the ancillary data 604 (step S706). If necessary, an audio file is created anew and recording of the stereo audio data 2 is started (step S707). Control then returns to the discrimination of end of the moving picture data (step S702). As a result, the stereo audio data 2 extracted from the ancillary data 604 is written to the audio file whenever an AAU in which the MC header 605 is included is received.

If the determination (step S705) regarding the presence of the stereo audio data 2 is such that there is no MC header 605, i.e., that the moving picture data does not include the stereo audio data 2 ("NO" at step S705), then control transitions to a determination regarding continuous audio recording (step S708). At step S708, it is determined whether silent data over an interval in which the MC header 605 is not detected from the AAU is to be recorded in the audio file of the stereo audio data 2. Whether silent data over an interval in which the MC header 605 is not detected is to be recorded in the audio file of the stereo audio data 2 can be set in the moving picture recording apparatus by the user in advance. In this case, the determination at step S708 is made by referring to the user setting.

By thus recording, in an audio file, silent data over an interval in which the MC header 605 is not detected, this interval can be recorded in the audio file of the stereo audio data 2 as a silent interval. For example, in a case where part of the stereo audio data 2 cannot be read out of the storage medium normally owing to a flaw in video tape or contamination of the heads, this portion is recorded in the audio file of the stereo audio data 2 as a silent interval. As a result, it is possible to determine at which portion the problem has occurred. Further, even if the interval is one in which normal playback cannot be performed, silent data corresponding to this interval is recorded. This makes it easy to synchronize the stereo audio data 2 of the audio file and the stereo audio data 1 of the moving picture file.

If the setting of continuous audio recording has been made ("YES" at step S708), then silent data over an interval in which the stereo audio data 2 has not been recorded continues to be recorded (step S709). Control then returns to the discrimination of end of the moving picture data (step S702).

On the other hand, if setting of continuous audio recording has not been made ("NO" at step S708), then it is determined whether to partition the file at the moment where the stereo audio data 2 is interrupted (step S710). This also can be set in the moving picture recording apparatus manually by the user in advance. If partitioning of the file has been set ("YES"; at step S710), then the audio file in which the stereo audio data 2 is being recorded is closed and completed as a file using as a breakpoint the timing at which the MC header 605 is no longer detected. That is, recording to the audio file is concluded. A file for recording the stereo audio data 2 in a case where the MC header 605 is detected next is then generated (step S711). Control thenceforth returns to the discrimination of end of the moving picture data (step S702). Accordingly, in a case where the MC header 605 is detected next, recording of the data in the new audio file starts at this point.

If partitioning of the file has not been set, ("NO" at step S710), then control returns directly to the discrimination of end of the moving picture data (step S702). In this case, if the MC header 605 is subsequently detected again by the time recording ends, then the file of the stereo audio data 2 will includes one or more temporal discontinuities.

By virtue of the processing set forth above, a file usually formed from moving picture data in which the stereo audio data 2 has been interleaved becomes a file of moving picture data shown in FIG. 8A and a file of stereo audio data 2 shown in FIG. 8B. Data in FIGS. 8A and 8B identical with that shown in FIG. 5 is identified by like reference characters.

In a case where there is an interval in which the MC header 605 is not detected, part of the file of the stereo audio data 2 in FIG. 8B will be a silent segment if continuous recording has been set. Further, if partitioned recording has been set, then the file of the stereo audio data 2 in FIG. 8B will be partitioned at the timing at which the MC header 605 fails to be detected. Accordingly, there will be formed a plurality of files in which have been recorded the stereo audio data 2 from the moment the MC header 605 starts being detected. Further, in a case where neither continuous recording nor partitioned recording have been set, the file of stereo audio data 2 will be a single file but it will includes one or more temporal discontinuities.

In accordance with this embodiment, as described above, audio data of channels from a third channel onward is extracted from moving picture data in which video data has been interleaved with audio data that is beyond stereo audio data (namely audio data of three or more channels), and the audio data is recorded as a separate file. This means that audio data of channels from a third channel onward can be used even in a conventional moving picture editing application that supports only a combination of one item of video data and one item of stereo audio data with one item of moving picture data.

In other words, by utilizing a conventional moving picture editing application, it is possible to perform editing that makes use of audio data on all audio channels of moving picture data recorded on multiple channels.

Other Exemplary Embodiments

In order to facilitate the description and understanding of the above exemplary embodiment, video data and audio data has been described as being MPEG2-TS data. However, it goes without saying that the present invention is applicable if the format is a moving picture data format in which multichannel audio recording can be performed and, moreover, a moving picture data format in which multichannel discrimination and channel-by-channel data sectioning are possible.

Further, in the above exemplary embodiment, two items of stereo audio data (4-channel audio) are described as an example of multichannel audio data. However, it goes without saying that if multichannel discrimination and channel-by-channel sectioning are possible in a manner similar to that of the moving picture data format, then recording as separate files can be performed on a per-channel basis. In other words, it may be so arranged that four channels, namely first to fourth channels, are generated.

Further, it may be so arranged that recording as a separate file may be performed with regard to the stereo audio data 1 as well. In a case where multichannel audio data is included in moving picture data, it is preferred from the standpoint of ease of use to adopt an arrangement in which the user can set how to record audio data of channels from a third channel onward. For example, it is preferred that the user be capable of setting whether third and fourth channels of stereo audio data 2 are recorded as separate files, whether channels of audio data of a third channel onward are recorded as files channel by channel, and whether first and second channels of audio data are recorded as files.

It should be noted that the personal computer 103 of the above exemplary embodiment is also capable of recording received moving picture data as streaming data. If there is a moving picture editing application that supports editing of multichannel moving picture data, therefore, stream data may be edited using this application.

Only a case where silent data is continuously recorded in an audio file or where an audio file is partitioned and recorded in and silent data is not recorded in the file has been described as a method of handling intervals in which the MC header 605 is not detected. However, it is possible to adopt an arrangement in which an audio file is partitioned and recorded in and silent data over a period of time corresponding to an interval in which the MC header 605 is not detected is recorded as a file separate from the audio file.

Further, an audio file may be partitioned and recorded in, silent data over a period of time corresponding to an interval in which the MC header 605 is not detected may be continuously recorded in the audio file and the audio file may be partitioned at the moment the MC header 605 is detected next. Furthermore, it may be so arranged that an audio file is partitioned and recorded in, and silent data over a period of time corresponding to an interval in which the MC header 605 is not detected is appended to the beginning of audio data generated at the moment the MC header 605 is detected next.

It is preferred that the user be capable of setting which recording method is employed.

The above exemplary embodiment has been described with regard to an arrangement in which recording is carried out based upon moving picture data received from a moving picture data output apparatus such as the DVC 101. However, the moving picture recording apparatus in the above exemplary embodiment may be incorporated in the DVC 101. In this case, it can be so arranged that when the moving picture data is output from the DVC 101, an audio file is output in addition to the moving picture data in accordance with a setting made by the user.

Further, it is possible to adopt an arrangement in which moving picture data is acquired from a computer network by communication, or in which moving picture data is acquired using an apparatus that is capable of reading a removable storage medium such as a DVD drive.

The above exemplary embodiments are also capable of being implemented by software using the computer (or CPU or MPU, etc.) of a system or apparatus. In this case, a computer program that causes the computer to implement the functions described in any one of the above exemplary embodiments, may be incorporated as an image capture program of an image editing application.

Accordingly, in order to implement the functional processing of the present invention, a computer program per se supplied to and installed in the computer also implements the present invention. In other words, a computer program for implementing the functional processing of the present invention also is covered by the present invention.

In this case, so long as the system or apparatus has the functions of the computer program, the form of the computer program, e.g., object code, a program executed by an interpreter or script data supplied to an operating system, etc., does not matter.

In this case, the computer program for implementing the functional processing of the present invention is supplied to the computer from a storage medium or through use of wired/wireless communication.

Examples of storage media for storing the computer program are magnetic storage media such as flexible disk, hard disk and magnetic tape, optical/magneto-optical storage media such as a magneto-optical disk, CD and DVD, and a non-volatile semiconductor memory.

A method utilizing a server on a computer network is available as a method of supplying a computer program using wired/wireless communication. In this case, a computer program file serving as a file that includes a computer program forming the present invention is stored in a server beforehand. The computer program file may be in an executable format or a source code.

The computer program file is supplied by being downloaded to a client computer that has accessed a server. In this case, the computer program file can be divided into a plurality of segment files and the segment files can be deployed by dispersing them at different servers.

In other words, the present invention also covers a server apparatus that supplies a client computer with a computer program for implementing the functional processing of the present invention by computer.

Further, a storage medium on which the computer program of the present invention has been encrypted and stored can be distributed to users, users who meet certain requirements can be supplied with key information for decrypting the code, and the computer program can be allowed to be installed on the computers of these users. The key information can be supplied by downloading it from a website via the Internet, by way of example.

Further, the computer program that causes the computer to implement the functions described in any one of the above exemplary embodiments may use an operating system already running on the computer.

Furthermore, at least part of the computer program constituting the present invention may be supplied as firmware such as an expansion board inserted into the computer, and the functions of the above exemplary embodiment or other exemplary embodiments may be implemented utilizing a CPU possessed by the expansion board, etc.

While the present invention has been described with reference to exemplary embodiments, it is understood that the present invention is not limited to the disclosed exemplary embodiments. The scope of the following claims is to be accorded the broadest interpretation so as to encompass all modifications, equivalent structures and functions.

The application claims the benefit of Japanese Application No. 2005-310571 filed Oct. 25, 2005, which is hereby incorporated by reference herein in its entirety.

What is claimed is:

1. A moving picture recording apparatus comprising:
a receiving unit that receives moving picture data that includes video data, first and second channels of audio data, and third and fourth channels of audio data from an external device; and
a control unit that (a) controls the moving picture recording apparatus to store the moving picture data that includes the video data, the first and second channels of audio data, and the third and fourth channels of audio data in a moving picture file, and (b) controls the moving picture recording apparatus to store the third and fourth channels of audio data extracted from the moving picture data in an audio file different from the moving picture file without storing the first and second channels of audio data in the audio file,
wherein the control unit controls the moving picture recording apparatus to store silent data in the audio file, when a predetermined data is not detected from the moving picture data and a first user setting is activated,
wherein the control unit controls the moving picture recording apparatus to close the audio file and generate a new audio file for storing the third and fourth channels of audio data, when the predetermined data is not detected from the moving picture data, the first user setting is not activated, and a second user setting is activated, and
wherein the control unit controls the moving picture recording apparatus not to close the audio file so that the moving picture recording apparatus can store the third and fourth channels of audio data in the audio file without storing silent data in the audio file, when the predetermined data is not detected from the moving picture data, the first user setting is not activated, and the second user setting is not activated.

2. The moving picture recording apparatus according to claim 1, wherein the first and second channels of audio data are included in first stereo audio data, and the third and fourth channels of audio data are included in second stereo audio data.

3. A method of controlling a moving picture recording apparatus, the method comprising the steps of:
controlling the moving picture recording apparatus to receive moving picture data that includes video data, first and second channels of audio data, and third and fourth channels of audio data from an external device;
controlling the moving picture recording apparatus to store the moving picture data that includes the video data, the first and second channels of audio data, and the third and fourth channels of audio data in a moving picture file;
controlling the moving picture recording apparatus to store the third and fourth channels of audio data extracted from the moving picture data in an audio file different from the moving picture file without storing the first and second channels of audio data in the audio file;
controlling the moving picture recording apparatus to store silent data in the audio file, when a predetermined data is not detected from the moving picture data and a first user setting is activated,
controlling the moving picture recording apparatus to close the audio file and generate a new audio file for storing the third and fourth channels of audio data, when the predetermined data is not detected from the moving picture data, the first user setting is not activated, and a second user setting is activated; and
controlling the moving picture recording apparatus not to close the audio file so that the moving picture recording apparatus can store the third and fourth channels of audio data in the audio file without storing silent data in the audio file, when the predetermined data is not detected from the moving picture data, the first user setting is not activated, and the second user setting is not activated.

4. The method according to claim 3, wherein the first and second channels of audio data are included in first stereo audio data, and the third and fourth channels of audio data are included in second stereo audio data.

5. A non-transitory computer-readable storage medium storing a program for causing a computer to execute a method of controlling a moving picture recording apparatus, the method comprising the steps of:
controlling the moving picture recording apparatus to receive moving picture data that includes video data, first and second channels of audio data, and third and fourth channels of audio data from an external device;
controlling the moving picture recording apparatus to store the moving picture data that includes the video data, the first and second channels of audio data, and the third and fourth channels of audio data in a moving picture file;
controlling the moving picture recording apparatus to store the third and fourth channels of audio data extracted from the moving picture data in an audio file different from the moving picture file without storing the first and second channels of audio data in the audio file;

controlling the moving picture recording apparatus to store silent data in the audio file, when a predetermined data is not detected from the moving picture data and a first user setting is activated;

controlling the moving picture recording apparatus to close the audio file and generate a new audio file for storing the third and fourth channels of audio data, when the predetermined data is not detected from the moving picture data, the first user setting is not activated, and a second user setting is activated; and controlling the moving picture recording apparatus not to close the audio file so that the moving picture recording apparatus can store the third and fourth channels of audio data in the audio file without storing silent data in the audio file, when the predetermined data is not detected from the moving picture data, the first user setting is not activated, and the second user setting is not activated.

6. The computer-readable storage medium according to claim 5, wherein the first and second channels of audio data are included in first stereo audio data, and the third and fourth channels of audio data are included in second stereo audio data.

* * * * *